(12) United States Patent
Carr et al.

(10) Patent No.: US 7,747,829 B2
(45) Date of Patent: Jun. 29, 2010

(54) ARRANGEMENT AND METHOD FOR UPDATE OF CONFIGURATION CACHE DATA

(75) Inventors: David John Carr, Southampton (GB); Michael John Jones, Eastleigh (GB); Andrew Key, Southampton (GB); Robert Bruce Nicholson, Southsea (GB); William James Scales, Fareham (GB); Barry Douglas Whyte, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 12/171,680

(22) Filed: Jul. 11, 2008

(65) Prior Publication Data

US 2009/0006763 A1 Jan. 1, 2009

Related U.S. Application Data

(63) Continuation of application No. 11/535,522, filed on Sep. 27, 2006, now Pat. No. 7,461,217, which is a continuation of application No. 10/600,549, filed on Jun. 20, 2003, now Pat. No. 7,237,069.

(30) Foreign Application Priority Data

Jun. 26, 2002 (GB) .................................. 0214670.2

(51) Int. Cl.
G06F 12/00 (2006.01)
(52) U.S. Cl. ...................................... 711/154; 711/114
(58) Field of Classification Search ...................... None
See application file for complete search history.

(56) References Cited

U.S. PATENT DOCUMENTS

| 5,799,141 | A | * | 8/1998 | Galipeau et al. | 714/13 |
|---|---|---|---|---|---|
| 5,895,493 | A | | 4/1999 | Gatica | 711/147 |
| 6,321,298 | B1 | | 11/2001 | Hubis | 711/148 |
| 6,330,642 | B1 | | 12/2001 | Carteau | 711/114 |
| 6,584,546 | B2 | | 6/2003 | Kavipurapu | 711/120 |
| 6,601,138 | B2 | | 7/2003 | Otterness et al. | 711/114 |
| 6,973,473 | B1 | * | 12/2005 | Novaes et al. | 709/201 |
| 2001/0049774 | A1 | | 12/2001 | Otterness et al. | 711/148 |

OTHER PUBLICATIONS

Tanenbaum, "Structured Computer Organization", © 1984, Prentice-Hall, Inc., p. 10-12.

* cited by examiner

*Primary Examiner*—Brian R Peugh
(74) *Attorney, Agent, or Firm*—Harrington & Smith

(57) ABSTRACT

An arrangement and method for update of configuration cache data in a disk storage subsystem in which a cache memory (110) is updated using two-phase (220, 250) commit technique. This provides the advantage that known changes to the subsystem do not require an invalidate/rebuild style operation on the cache. This is especially important where a change will invalidate the entire cache.

11 Claims, 4 Drawing Sheets

ARRANGEMENT AND METHOD FOR UPDATE OF CONFIGURATION CACHE DATA

CROSS REFERENCE TO RELATED APPLICATIONS

This application is a continuation application of U.S. patent application Ser. No. 11/535,522 (filed Sep. 27, 2006, now U.S. Pat. No. 7,461,217); which is itself a continuation of U.S. patent application Ser. No. 10/600,549 (filed Jun. 20, 2003, now U.S. Pat. No. 7,237,069); which claims priority from United Kingdom Patent Application No. 0214670.2 (filed Jun. 6, 2002).

FIELD OF THE INVENTION

This invention relates to data storage systems (and subsystems) and methods for operation thereof.

BACKGROUND OF THE INVENTION

In the field of this invention it is known that enhanced function storage subsystems (e.g., for a system of one or more disk drives) contain many logical resources. These resources can be managed by a storage adapter or controller. In this context, a logical resource is an entity which exposes a disk-like behaviour but which may have properties not ordinarily associated with individual disk drives. These properties include enhanced performance, reliability, availability and data transformation operations such as flash copy. There may be a complex many-to-many relationship between logical resources and other logical resources or physical resources. For example a RAID-5 (Redundant Array of Independent Disks) arrangement contains usually between 4 and 16 component disks. Data is striped across the components and a parity check is calculated and stored. The attributes of, and relationships between, these logical resources must be gathered and manipulated by software products to allow users to maintain their subsystem. Since the primary purpose of such a storage subsystem is to perform Input/Output (IO) operations from operating system to disk drive(s)—IO has priority. This may be at the expense of user transactions that are sent to the subsystem in order to generate the details of the logical resources available in the subsystem. This in turn can result in very slow user response times—especially when the subsystem is under heavy IO load.

It is known to provide a cache of subsystem configuration data. This provides a centralized point of reference for user information relating to the subsystem. It is known from U.S. Pat. No. 5,895,493 that such a system will gather information from various systems and provide a point for the user to access and obtain information about a group of systems.

However, this approach has the disadvantage(s) that the system of the referenced patent does not describe how this data is updated. It relies on the subsystems notifying the main cache of changes and updates and passing the data.

A need therefore exists for an arrangement and method of updating storage subsystem cache data wherein the above-mentioned disadvantage(s) may be alleviated.

STATEMENT OF INVENTION

In accordance with a first aspect of the present invention there is provided an arrangement for update of cache data in a storage system, the arrangement comprising: memory means for holding data; cache means for holding data associated with the memory means; means for preparing change data for updating the cache means; means for submitting a request for change to the memory means; means for receiving a signal from the memory means representative of completion of the request for change; and means for updating the cache means with the change data in response to the signal indicating successful completion of the request for change.

Preferably, the data comprises configuration data.

Preferably, the storage system comprises a disk storage subsystem.

Preferably, the memory means is comprised in a disk adapter.

Preferably, the memory means is comprised in a disk controller.

The arrangement preferably further comprises interconnect means coupled between the memory means and the cache means for communicating the request for change, the signal representative of completion of the request for change.

Preferably, the interconnect means is also arranged to communicate transaction data.

Preferably, the interconnect means comprises a device driver.

According to a second aspect of the present invention, there is provided a method for update of cache data in a storage system, the method comprising: providing memory means holding data; providing cache means holding data associated with the memory means; preparing change data for updating the cache means; submitting a request for change to the memory means; receiving a signal from the memory means representative of completion of the request for change; and updating the cache means with the change data in response to the signal indicating successful completion of the request for change.

Preferably, the data comprises configuration data.

Preferably, the storage system comprises a disk storage subsystem.

Preferably, the memory means is provided in a disk adapter.

Preferably, the memory means is provided in a disk controller.

The method preferably further comprises providing interconnect means coupled between the memory means and the cache means for communicating the request for change, the signal representative of completion of the request for change.

Preferably, the interconnect means also communicates transaction data.

Preferably, the interconnect means comprises a device driver.

In a third aspect, the present invention provides a computer program element comprising computer program means for performing the method of the second aspect, and preferably for performing the additional preferred features of the method of the second aspect.

BRIEF DESCRIPTION OF THE DRAWINGS

One arrangement and method of updating configuration cache data incorporating the present invention will now be described, by way of example only, with reference to the accompanying drawings, in which.

DESCRIPTION OF PREFERRED EMBODIMENT

Enhanced function storage subsystems (e.g., for a system of one or more disk drives) contain many logical resources. Each logical resource generally relates to a particular function, for example a RAID-5 logical resource, a flash copy logical resource, etc. The attributes associated with these logical resources must be gathered by software products to allow users to maintain their subsystem. Since the primary purpose of such a storage subsystem is to perform Input/Output (IO) operations from operating system to disk drive(s)—IO has priority. This may be at the expense of user transactions that are sent to the subsystem in order to generate the details of the logical resources available in the subsystem. This in turn can result in very slow user response times—especially when the subsystem is under heavy IO.

In summary, the preferred embodiment of this invention provides a way in which the configuration software running in the host can cache the results of the logical resource configuration discovery transactions and hence re-use the same transaction data when applicable. The present invention is based on the realisation by the inventor that in general subsystem logical resources do not change, and that therefore the cache can be used in preference to "talking" to the subsystem to find out what it has in terms of logical resources. This results in greatly reduced user response times, and reduces the non-essential workload on the subsystem. In particular the preferred embodiment of this invention provides a method of cache update involving a 2-phase commit of the data.

Figure 1:
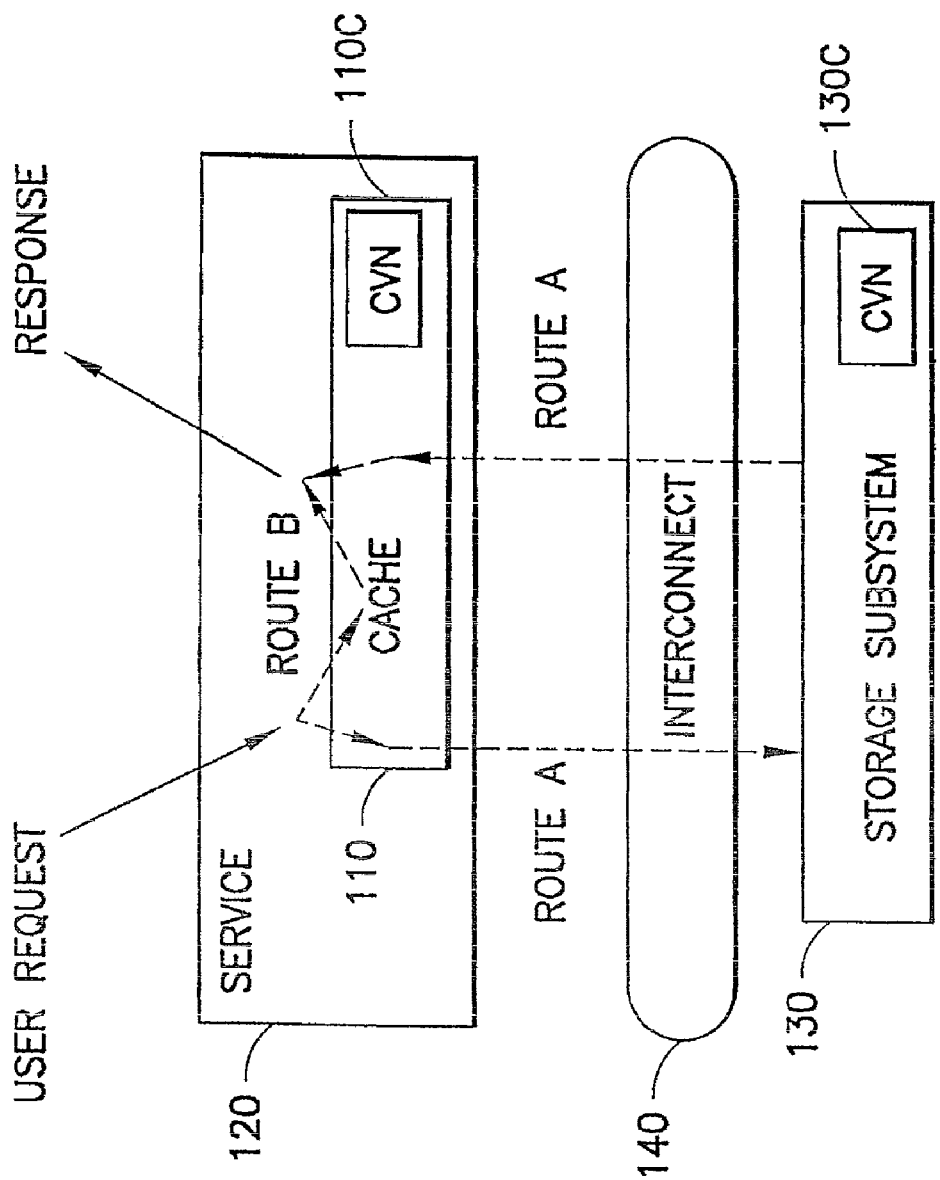
FIG. 1 shows a preferred embodiment of a configuration cache.

The configuration cache can be implemented in various ways, the preferred embodiment being illustrated with respect to FIG. 1.

The cache 110 is part of an agent or service 120 that runs in the host that connects to the storage subsystem. This service, when initialized, can request all the logical resource information from the storage subsystem 130 via an interconnect 140 which may be the same interconnect that is used for I/O transactions or may be another interconnect specifically provided for the purposes of configuration. The logical configuration data that is returned is saved in the cache for subsequent use. The storage subsystem also returns a Configuration Version Number (CVN). This number is the current CVN stored (130C) by the storage subsystem, and hence 'version stamps' the current configuration cache. The storage subsystem increments this number whenever it detects a change in its logical configuration. In this way the software can ask the storage subsystem its CVN, check this against the CVN (110C) that was stored in the cache and act accordingly.

Figure 1A:
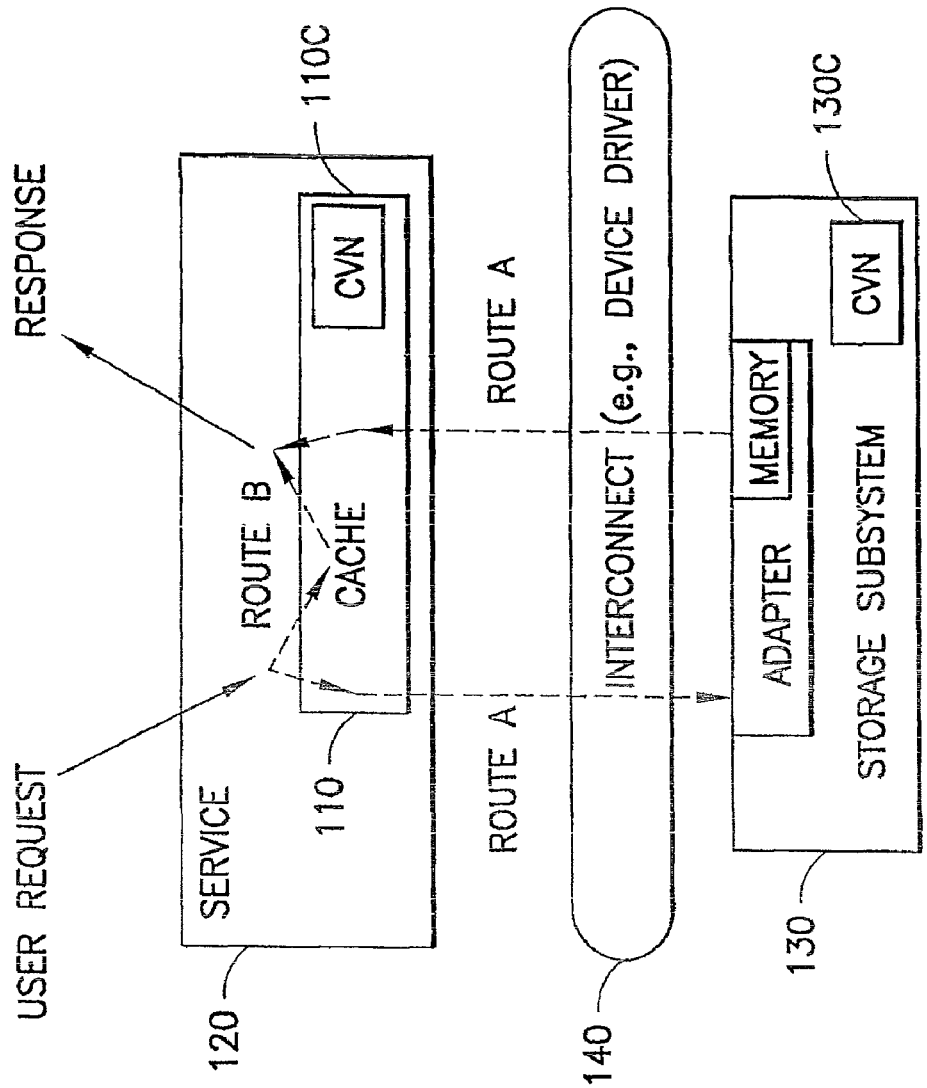
FIGS. 1A and 1B are schematic diagrams showing possible routes for user requests in a disk storage subsystem having a host service routine or agent containing a cache and accessing the storage subsystem via an interconnect.
Figure 1B:
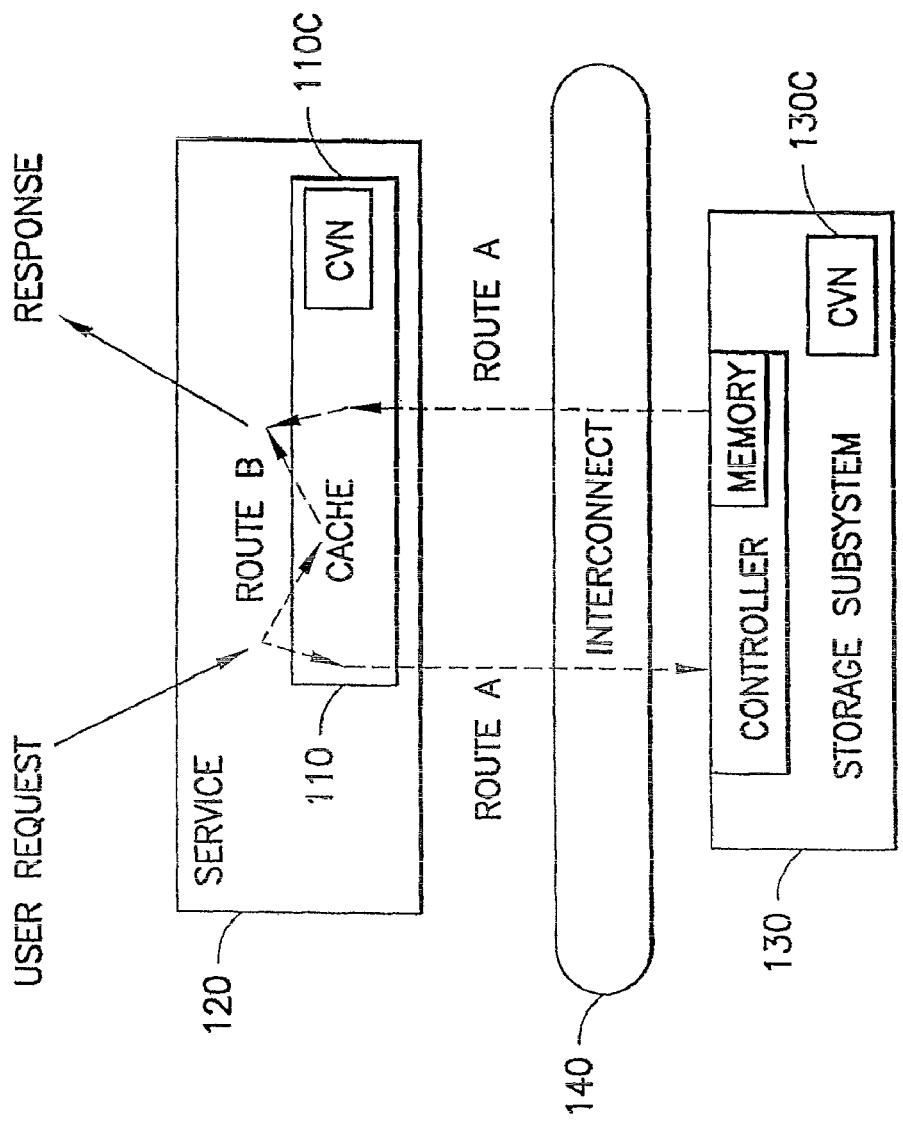

It will be understood that, although as shown in FIG. 1 communication between the service and the subsystem occurs via the interconnect 140, this interconnect may in practice be provided in the form of a device driver in an adapter-based solution where the device driver communicates with an adapter, as shown in FIG. 1A, of the storage subsystem. Alternatively, the interconnect may communicate with a controller, as shown in FIG. 1B, of the storage subsystem. It will further be understood that the arrangement shown in FIG. 1 represents both "in band" communication where the service uses the same route as I/O transactions and "out of band" communication over perhaps Ethernet or some other interconnect.

For example, where a single host contains an adapter and the required "service" software is running in the host:

a) The service requests the entire logical configuration from the adapter.
b) The service receives the transaction data (stores it in the cache) and a CVN=123.
c) Some time later the service receives a request from one of its clients that involves generating a "view" of a logical resource.
d) The service requests the adapter CVN (130C)
e) The adapter returns a CVN=123
f) The service checks this against its cache (110C), they are the same and so returns the cached "view" to the client. The User Request therefore follows 'Route B' (as shown by dotted line in FIG. 1) to produce the Response.

Some time later the service receives a new request for another "view" of a logical resource:

a) The service requests the adapter CVN (130C)
b) The adapter returns a CVN=125
c) The service checks this against its cache (110C), they are different and so the service then submits the relevant transactions to the adapter so as to rebuild the "view" of the logical resource.
d) The adapter returns the transaction data. The User Request therefore follows 'Route A' (as shown by dashed line in FIG. 1) to produce the Response.

At this stage, the cache is now possibly incoherent, and in the idle loop the contents can be updated.

It will be understood that the system as described above in relation to FIG. 1 is well known and need not be described in further detail. It will also be understood that the cache invalidation technique required to cope with possible incoherence of the cache is well known and also need not be described further.

Figure 2:
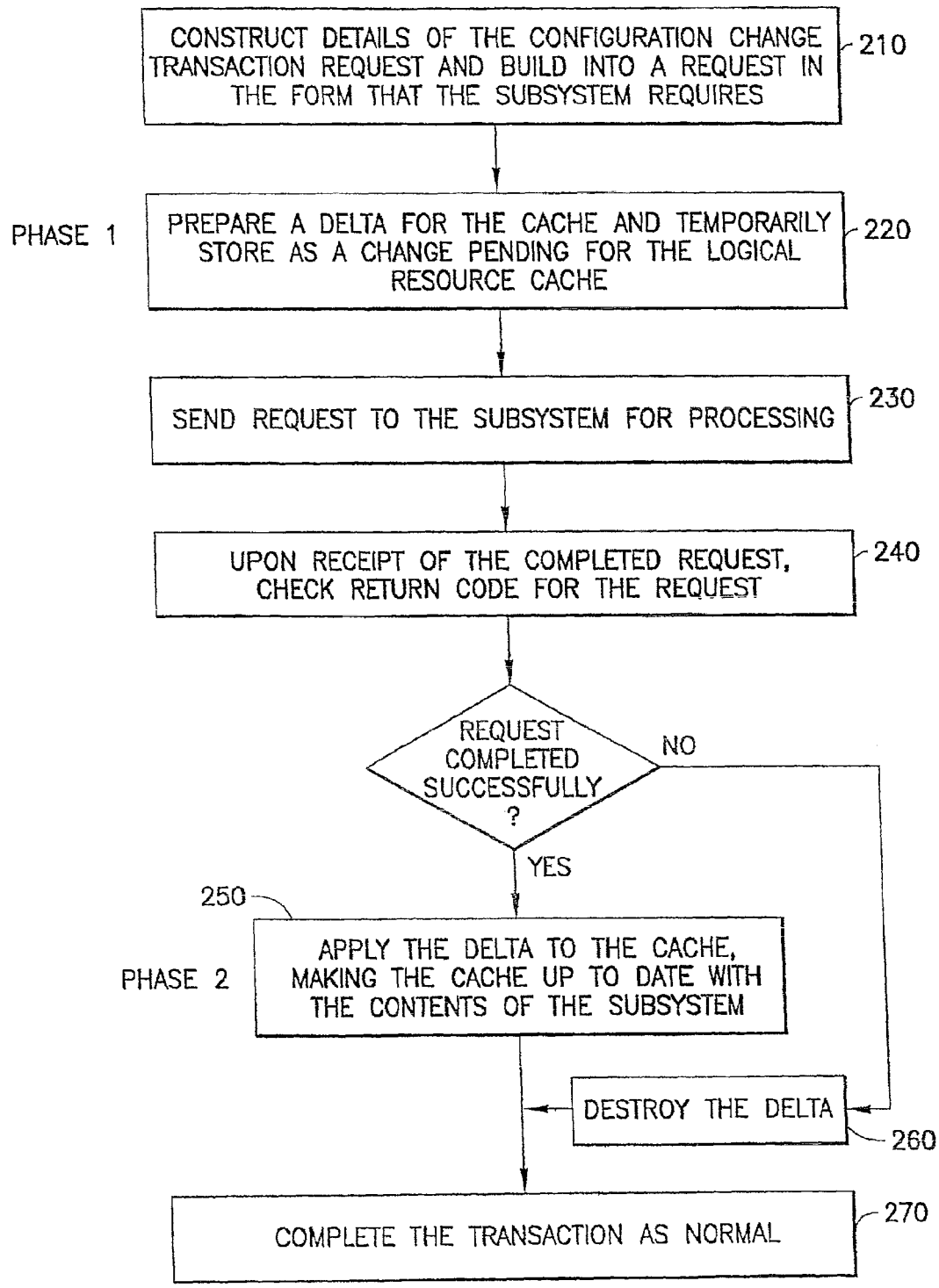
FIG. 2 shows a flow chart illustrating a write-through cache method with two phase commit used in the system of FIG. 1.

Referring now also to FIG. 2, a write-through cache with two phase commit technique is used for logical configuration cache update.

When the user submits a configuration change transaction, the details of the request are constructed and are built into a request in the form that the subsystem requires (step 210). At this time a delta (change data) is prepared for the cache and is temporarily stored as a change pending for the logical resource cache (step 220)—this step constitutes phase 1 of the two-phase commit procedure.

The request is then sent to the subsystem for processing (step 230).

Upon receipt of the completed request the return code for the request is checked (step 240) (the return code may conveniently be an integer value that indicates either success or failure of a particular request—in the case of a failure the return code may be decoded into a failure reason):

a) if the request completed successfully the delta is applied to the cache and the cache is now up to date with the contents of the subsystem (step 260)—this constitutes phase 2 of the two-phase commit procedure;
b) if the request failed, the delta is destroyed (step 260) because there is no need for it to be applied to the cache.

The transaction is then completed as normal (step 270).

It will be understood that the method of update of configuration cache data described above provides the advantage that known changes to the subsystem do not require an invalidate/rebuild style operation on the cache. This is especially important in the cache outlined above, where a change will invalidate the entire cache.

It will be appreciated that the method described above for update of configuration cache data will typically be carried out in software running on a processor (not shown), and that the software may be provided as a computer program element carried on any suitable data carrier (also not shown) such as a magnetic or optical computer disc.

It will also be appreciated that various modifications to the embodiment described above will be apparent to a person of ordinary skill in the art.

What is claimed is:

1. An apparatus for updating of cache data in a storage system, the apparatus comprising:
   a memory for storing data;
   a cache, separate from the memory, for storing data associated with the memory;
   at least one processor for preparing change data for updating the cache, the at least one processor comprising circuitry for
   receiving a configuration change transaction;
   in response to the received configuration change transaction, constructing a request for change;
   submitting the request for change to the memory;
   receiving a signal from the memory representative of completion of the request for change; and
   updating the cache with the change data and with an updated version number in response to the signal indicating successful completion of the request for change; and
   responsive to a user request for a view of a logical resource stored in the memory, the processor is adapted to compare a number of the user request to the updated version number and if they are the same to produce a response from the cache, and if they are not the same to produce a response from the memory.

2. The apparatus of claim 1 wherein the data comprises configuration data.

3. The apparatus of claim 1 wherein the storage system comprises a disk storage subsystem.

4. The apparatus of claim 3 wherein the memory is comprised in a disk adapter.

5. The apparatus of claim 3 wherein the memory is comprised in a disk controller.

6. The apparatus of claim 1 further comprising an interconnect coupled between the memory and the cache for communicating the request for change, and the signal representative of completion of the request for change.

7. The apparatus of claim 6 wherein the interconnect is also arranged to communicate the response to the user request if the number of the user request and the updated version number are not the same.

8. The apparatus of claim 6 wherein the interconnect comprises a device driver.

9. A computer program storage device readable by a machine and comprising executable computer program instructions for updating of a cache in a storage system, the storage system comprising a memory holding data and a cache, separate from the memory, holding data associated with the memory, the instructions for performing the method of:
   receiving a configuration change transaction;
   in response to the received configuration change transaction, constructing a request for change for updating the cache;
   submitting the request for change to the memory;
   receiving a signal from the memory representative of completion of the request for change; and
   updating the cache with the change data in response to the signal indicating successful completion of the request for change, and
   responsive to a user request for a view of a logical resource stored in the memory, comparing a number of the user request to the updated version number and if they are the same producing a response from the cache, and if they are not the same producing a response from the memory.

10. The apparatus of claim 1, wherein the data comprises results of logical resource configuration discovery transactions.

11. The apparatus of claim 1, wherein the cache is part of an agent that executes in a host.

* * * * *